United States Patent [19]

Lohneis et al.

[11] 4,449,866

[45] May 22, 1984

[54] SERVO-CONTROLLED SPINDLE DRIVE SYSTEM

[75] Inventors: Earl R. Lohneis, Milwaukee; Richard E. Stobbe, Greenfield, both of Wis.

[73] Assignee: Kearney & Trecker Corporation, West Allis, Wis.

[21] Appl. No.: 286,371

[22] Filed: Jul. 24, 1981

[51] Int. Cl.³ .................. B23B 47/14; B23B 47/22; F16H 5/16
[52] U.S. Cl. .................................. 408/9; 74/342; 408/124; 408/135; 409/231; 29/568
[58] Field of Search .................. 408/124, 9, 135; 409/231, 208; 74/341, 342, 344; 29/568

[56] References Cited

U.S. PATENT DOCUMENTS

| | | | |
|---|---|---|---|
| 727,977 | 5/1903 | Le Blond et al. | 74/341 |
| 1,059,434 | 4/1913 | Butler | 74/344 |
| 1,935,715 | 11/1933 | Hunt et al. | 408/124 X |
| 2,033,749 | 3/1936 | Walter | 409/231 X |
| 2,887,344 | 5/1959 | Hause | 408/135 X |
| 2,992,565 | 7/1961 | Hansen et al. | 74/346 |
| 3,150,537 | 9/1964 | Hermann | 74/472 |
| 3,259,023 | 7/1966 | Rieger et al. | 408/9 X |
| 3,429,224 | 2/1969 | Osburn | 409/231 |
| 3,461,472 | 8/1969 | Sedgwick et al. | 408/9 |
| 3,631,945 | 1/1972 | Ollearo | 192/3.51 |
| 3,789,500 | 2/1974 | Bondie et al. | 29/568 |
| 3,893,371 | 7/1975 | Frazier | 409/231 X |
| 4,051,583 | 10/1977 | Kato et al. | 409/231 X |
| 4,157,231 | 6/1979 | Phillips | 408/9 X |

FOREIGN PATENT DOCUMENTS 3002309  7/1981  Fed. Rep. of Germany ........ 74/342

Primary Examiner—Francis S. Husar
Assistant Examiner—Steven B. Katz
Attorney, Agent, or Firm—Quarles & Brady

[57] ABSTRACT

A servo system for the rotary spindle of a machine tool in which the spindle is driven by a drive motor through a gear train having shiftable gears for changing the rate of rotation of the spindle. The transducer for the servo system is mounted directly on the motor drive shaft in order to avoid all backlash between the resolver and the drive motor. However, the transducer is arranged to regulate the angular orientation of the spindle and must therefore be maintained in synchronism with the spindle. This is accomplished by arranging the shiftable gears so that when they are moving into engagement with a new gear, engagement with the previously engaged gear is maintained until initial engagement with the new gear is achieved. Further shifting movement into full engagement with the new gear operates to release the previously engaged gear. Thus, during the initial engagement with the new gear, the shiftable gear is momentarily in engagement with both gears. As a result, there can be no relative movement between the gears and synchronism with the transducer is thereby maintained.

4 Claims, 9 Drawing Figures

SERVO-CONTROLLED SPINDLE DRIVE SYSTEM

BACKGROUND OF THE INVENTION

This invention relates generally to machine tools having rotatable, tool-carrying spindles, and more specifically, to a servo-controlled drive system for angularly orientating the tool-carrying spindle of a machine tool.

Machine tools, of the type having a rotatably driven tool-carrying spindle, usually include a spindle gear train for transmitting rotational energy from a spindle drive motor to the spindle. In the past, such spindle gear trains have comprised at least two gears each keyed on a separate one of the spindle shaft and the input shaft, respectively, the input shaft being driven by the spindle drive motor. A cluster gear is journaled into the machine tool spindlehead parallel to the pair of gears and is axially slidable so that each of the cluster gear members can be moved into and out of engagement with each of the gears on the input and on the spindle shaft to vary the ratio of motor shaft rotation to spindle shaft rotation. Accurate angular positioning of the spindle shaft is accomplished by a feed back position transducer typically taking the form of a resolver whose shaft is coupled to the spindle drive shaft through one or more pinion gears. Electrical signals from the resolver, indicative of spindle shaft position, are employed by the machine tool control system to servo-control the spindle drive motor.

Prior art spindle drive systems, such as described above, are subject to the following disadvantages. Firstly, the feedback positioning loop, that is, the resolver and the gear train coupling the resolver to the spindle shaft, invariably exhibits excessive backlash, due to play between the cluster gear shaft and the motor shaft, which often results in unsatisfactory servo-control of the spindle drive motor. Secondly, to assure meshing of the cluster gear and each of the gears keyed on the spindle shaft and on the input shaft, it is usually necessary to "creep", that is to say, rotate the spindle gear train members very slowly during shifting, to prevent locking or jamming. This is often very time consuming. Thirdly, when the cluster gear of such prior art spindle drive systems is axially shifted to change spindle speed, synchronism between the drive motor shaft and the spindle shaft is not always maintained.

In contrast, the present invention concerns an improved servo-controlled spindle drive system which is not subject to the aforementioned disadvantages.

It is an object of the present invention to provide an improved servo-controlled spindle drive system in which there is zero backlash between the feedback transducer and the spindle drive system motor.

It is another object of the present invention to provide an improved servo-controlled spindle drive system having a gear train which may be shifted without the necessity of creeping the spindle.

It is yet another object of the present invention to provide an improved servo-controlled spindle drive system in which constant synchronism between the spindle motor shaft and the spindle is maintained.

BRIEF SUMMARY OF THE INVENTION

Briefly, in accordance with the preferred embodiment of the invention, an improved spindle drive train is provided for a machine tool having a spindlehead thereon for rotatably driving the cutting tool-carrying spindle rotatably journaled in the spindlehead at a plurality of speeds. The drive train includes a motor drive shaft carrying a pinion which is in constant meshing engagement with one of the three gear members of a shiftable cluster gear journaled in the spindlehead for rotation about an axis parallel to both the axis of the spindle rotation and the motor drive shaft. The cluster gear is shifted along its axis by a hydraulic cylinder to position the cluster gear either at one of three positions at which a separate one of the three cluster gear members engages a complementary one of three pinion gears fixed to a spindle drive shaft extending coaxially from the spindle. The spindle drive shaft gears are fixed thereon so that when the spindle is in a predetermined angular orientation the gear teeth that are in position to be engaged by the teeth of the gear on the gear cluster are in alignment for receiving the cluster gear teeth without the necessity of slightly rotating any of the gears. Moreover, the width of the gears are such that when the gear cluster is being shifted to change the speed range of the spindle the previously engaged gears remain in engagement with the initial engagement of the newly engaged gears is obtained and upon further shifting movement the previously engaged gears are released. This arrangement serves to prevent relative rotation of the gears, insuring that they only rotate in unison to preserve the synchronism between the spindle and a feedback transducer which is driven directly by the motor drive shaft for controlling the operation of the motor to thereby regulate the angular orientation of the spindle.

BRIEF DESCRIPTION OF THE DRAWINGS

The features of this invention believed to be novel are set forth with particularity in the appended claims. The invention itself, however, both as to organization and method of operation, together with further objects and advantages thereof, may best be understood by reference to the following description taken in conjunction with the accompanying drawings in which:

DETAILED DESCRIPTION OF THE PREFERRED EMBODIMENT

Figure 1A:
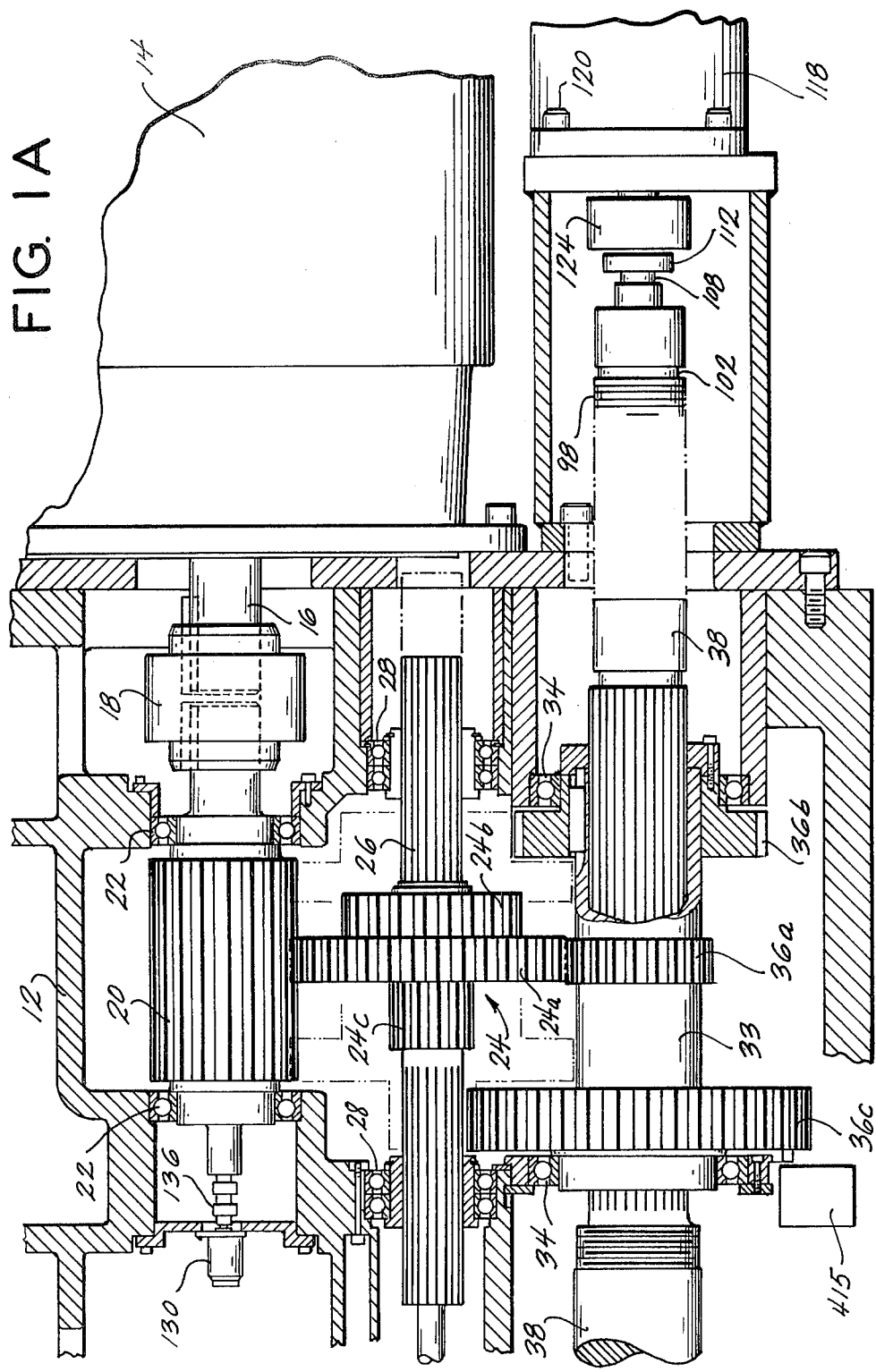
FIGS. 1A and 1B are the rearward and frontward longitudinal cross sections, respectively, of the spindle drive system of the present invention.
Figure 1B:
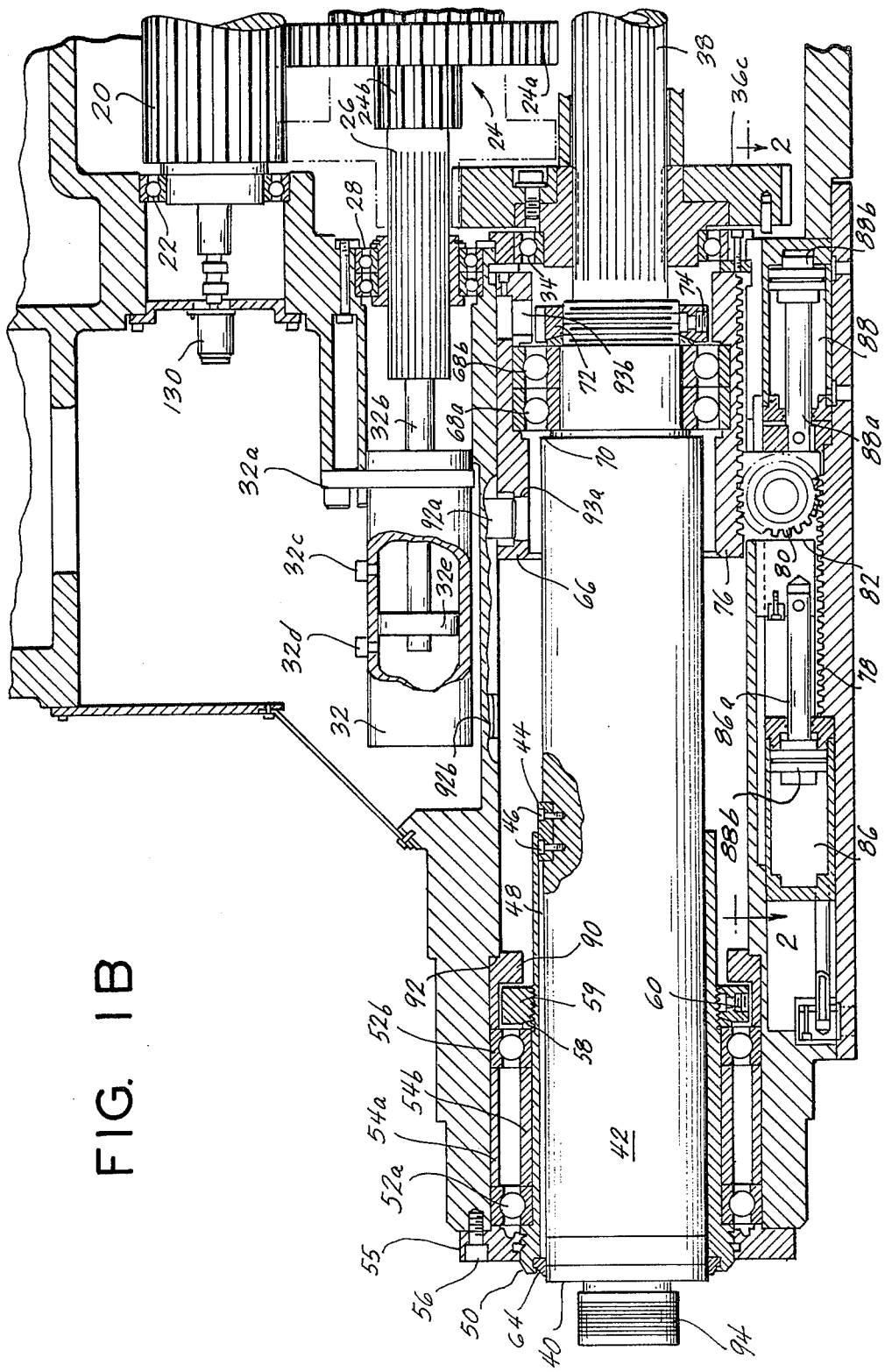
Figure 2:
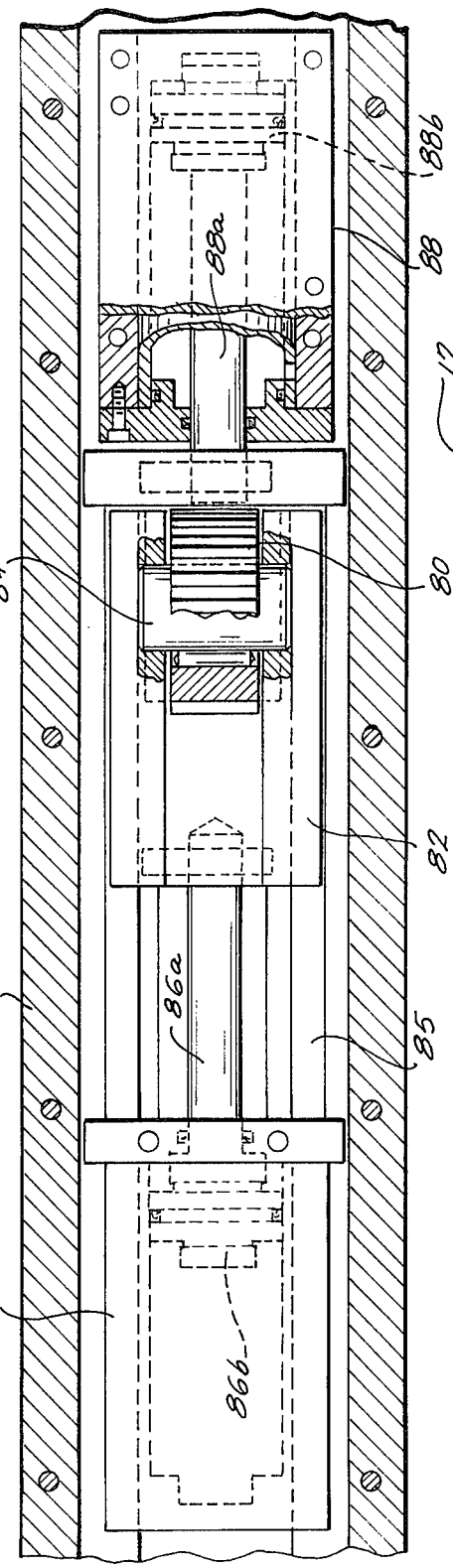
FIG. 2 is a top view of the spindle drive system illustrated in FIG. 1B taken along lines 2—2.
Figure 3:
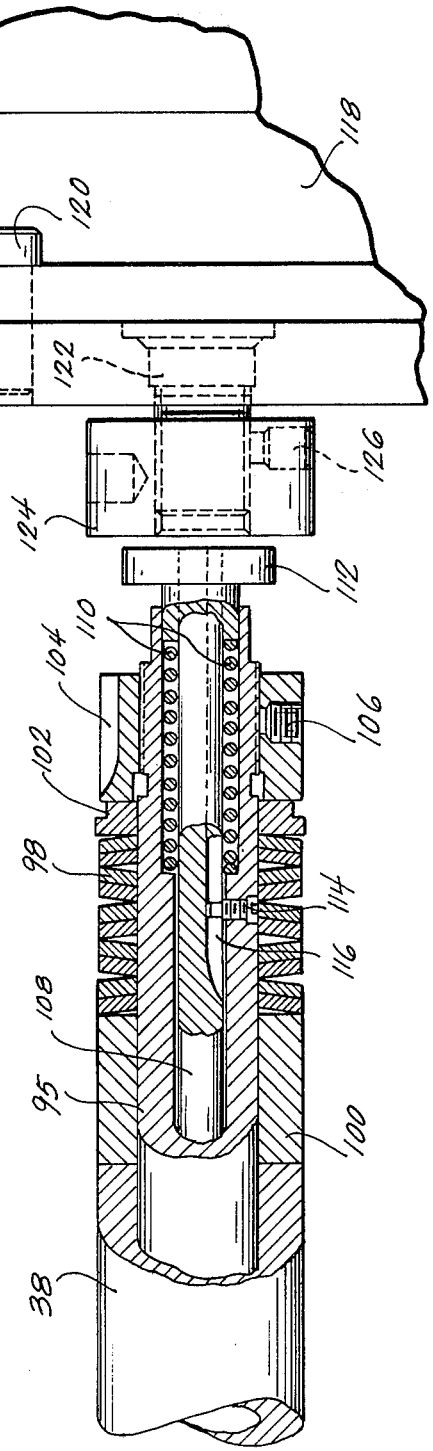
FIG. 3 is an enlarged cut-away view of a portion of the spindle drive system illustrated in FIG. 1A.

Referring jointly to FIGS. 1A and 1B, there is shown a cut away longitudinal view of a servo-controlled spindle drive system in accordance with the present invention which is disposed within the machine tool spindlehead 12, which is slidably mounted on the machine tool (not shown) for reciprocal movement thereon along a path normal to the path of travel of the machine tool table (not shown). A motor 14, typically a 15-25 HP (11.18-18.64 Kw) servo-controlled d.c. motor, is fastened to spindlehead 12 by a set of bolts or the like (not shown) so that the shaft 16 of motor 14 extends into spindlehead 12 through a passage in the right end thereof. Shaft 16 is connected by a coupling 18 to a drive pinion 20 which is rotatably journaled in spindlehead 12 coaxial with the motor shaft by bearings 22 for co-joint rotation with motor shaft 16.

A cluster gear 24, comprised of a main gear member 24a and a pair of differing sized auxiliary gear members 24b and 24c located on each side of gear member 24a, respectively, is fixed on a spindle shaft 26 which is rotatably supported for axial movement along an axis parallel to the axis of shaft 16. Shaft 26 is reciprocated along its axis by an actuator 32, which typically takes the form of a hydraulic cylinder whose frame 32a is fastened to the interior of spindlehead 12 by bolts or the like so that the shaft 32b of cylinder 32 is coaxial with cluster gear shaft 26 for coupling thereto. Hydraulic cylinder 32 has a pair of inlets 32c and 32d disposed therein for admitting pressurized hydraulic fluid into the cylinder on opposite sides of a piston 32e which is affixed to the end of cylinder shaft 32b within the cylinder. Admitting pressurized hydraulic fluid through inlet 32c forces piston 32e leftwardly which causes shaft 26 to be urged leftwardly. Conversely, admitting hydraulic fluid into cylinder 32 through inlet 32d forces piston 32e rightwardly, causing rightward movement of shaft 26. When hydraulic fluid of equal pressure is admitted through inlets 32c and 32d simultaneously, then cluster gear 24 and shaft 26 are displaced half way between their rightward and leftward position.

A hollow bore driving shaft 33 is journaled in spindlehead 12 by bearings 34 for rotation about an axis parallel to the axis of rotation of both drive pinion 20 and cluster gear shaft 26. Driving shaft 33 has three gears 36a, 36b and 36c keyed thereon which are each dimensioned to meshingly engage a separate one of cluster gear members 24a, 24b and 24c, respectively, when cluster gear member 24 is at its central, rightward-most position and leftward-most positions, respectively. During fabrication of the servo-controlled spindle drive system, gears 36a, 36b and 36c are keyed on driving shaft 33 so as to be a predetermined distance apart and the gears are aligned on driving shaft 33 such that when driving shaft 33 is at a predetermined angular orientation (hereinafter referred to as a spindle keylock position for reasons which will become clear hereinafter) the teeth on each of the gears are co-planer, that is to say, the teeth on each gear lines up with the teeth on each of the other gears. Affixing gears 36a, 36b and 36c on driving shaft 33 in the manner set forth above assures that when driving shaft 33 is oriented at the predetermined or keylock position, one of gears 36a, 36b and 36c engages a corresponding one of cluster gear members 24a, 24b and 24c, respectively, while another of gear members 36a, 36b and 36c disengages a corresponding one of cluster gear members 24a, 24b and 24c as shaft 26 and cluster gear 24 are reciprocated along their common axis by hydraulic cylinder 32. This assures constant synchronism between drive pinion 20 and driving shaft 33.

In the presently preferred embodiment, cluster gear member 24a and gear 36a and drive pinion 20 are dimensioned such that when cluster gear 24 is at its central-most position, effecting meshing engagement of cluster gear member 24a and drive pinion 20 and meshing engagement of gear 36a and cluster gear member 24a, shaft 33 makes one complete revolution for each revolution of drive pinion 20. Thus, when cluster gear 24 is at its central-most position, a 1:1 gear ratio exists between motor shaft 16 and driving shaft 33. Cluster gear member 24b and gear 36b are dimensioned such that when they are brought into meshing engagement with one another when cluster gear shaft 26 is biased rightwardly by cylinder 32, drive pinion 20 completes three revolutions for each revolution of drive shaft 33 so that 3:1 gear ratio exists between motor shaft 16 and driving shaft 33. Gear 36c and cluster gear member 24c are each dimensioned such that when they are brought into meshing engagement with one another when cluster gear shaft 26 is biased leftwardly by cylinder 32, drive pinion 20 makes nine complete revolutions for each revolution of driving shaft 33 so that a 9:1 gear exists between motor shaft 16 and driving shaft 33. It should be noted that by dimensioning gears 36a through 36c and each of corresponding cluster gear members 24a through 24c, respectively, differently, different gear ratios between motor shaft 16 and driving shaft 33 may be achieved.

The interior bore of driving shaft 33 is splined to engage complementary splines on the exterior surface of a driven shaft 38 integral with the machine tool spindle 40. Spindle 40 is carried in a quill 42 which is seated in spindlehead 12 so as to extend through the leftward or forward spindlehead end.

In the presently preferred embodiment spindle 40, which is conventional in construction, is configured to receive straight shank toolholders. Before a straight shank toolholder 94 is loaded into the spindle, the spindle is first rotated by energizing motor 14 to position spindle 40 at a predetermined angular orientation (at which angular orientation the teeth on each of gears 36a, 36b and 36c keyed on driving shaft 33 are each co-planer) so that the spindle keyway (not shown) is in alignment with the toolholder key thereby permitting firm engagement in the spindle of straight shank toolholder 94 which, typically, is loaded automatically into the spindle from a machine tool storage magazine (not shown) by a tool transfer mechanism (not shown) in accordance with programmed commands. For reasons which are now clear, the predetermined angular orientation of the spindle at which the spindle key is in alignment to the toolholder key is referred as a spindle keylock position.

Referring back to FIGS. 1A and 1B, it will be recalled that the teeth on each of gears 36a, 36b and 36c on driving shaft 33 are in alignment with the teeth on each of the other gears on the driving shaft 33 when spindle 40 and hence driving shaft 33 are at a predetermined angular orientation (the spindle keylock position). Since the teeth on the gears on the driving shaft are in alignment when the spindle is at the keylock position, it is desirable to shift cluster gear 24 when the spindle is at the keylock position. Otherwise jamming of current voltage to be induced in resolver rotor winding 130c.

The alternating current voltage induced in resolver rotor winding 130c, which crudely approximates a sinusoidal waveform, is filtered by a filter 142 to yield a nearly sinusoidal a.c. voltage which is supplied to the input of a squaring or peaking circuit 144, such as are well known in the art. In response to the sinusoidal input voltage provided thereto from filter 142, squaring circuit 144 generates a square wave output voltage varying in frequency and amplitude with the sinusoidal input voltage. The square wave output voltage is supplied to the input of a zero crossing detector 146. Zero crossing detector 146 produces a unipolar pulse each time the square wave input voltage supplied to the zero crossing detector undergoes a positive zero crossing.

The unipolar pulse produced by zero crossing detector 146 each time the square wave output signal of squaring circuit 144 undergoes a positive zero crossing is supplied to the clock input of a 12-bit latch 148. Latch 148 is coupled at each of its 12 inputs $L_1$-$L_{12}$ to counter 136 for receiving a separate one of counter output signals $C_1$-$C_{12}$, respectively. Each of the 12 outputs, $O_1$-$O_{12}$ of latch 148 is coupled via a separate one of the conductors of a multiconductor cable 150 to a computer numerically controlled machine tool 152. Computer numerically controlled machine tool 152, in practice, comprises a numerically controlled machine tool 153, (one element of which is the spindle drive train described above) and a machine tool control system 154 which controls the operation of machine tool 153. Machine tool control system 154 includes processing means 162, typically taking the form of a digital computer which is coupled through a first input/output port 164 to cable 150. A second input/output port 166 couples computer 162 to numerically controlled machine tool 153 which is typically a horizontal or vertical spindle machining center, whose operation including the linear movement of quill 42 (FIG. 1B) and the energization of motor 14 (FIG. 1A) is controlled by computer 162 in accordance with a set of programs stored in a memory 170 coupled to the computer.

Figure 5A:
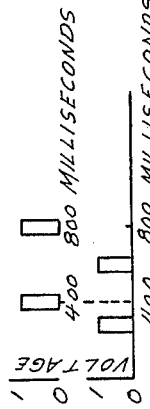
FIGS. 5A and 5B are graphic illustrations with respect to time of signals produced by the processing circuit of FIG. 4 when the shaft of feedback transducer remains stationary and when the feedback transducer shaft is rotating, respectively.
Figure 5B:
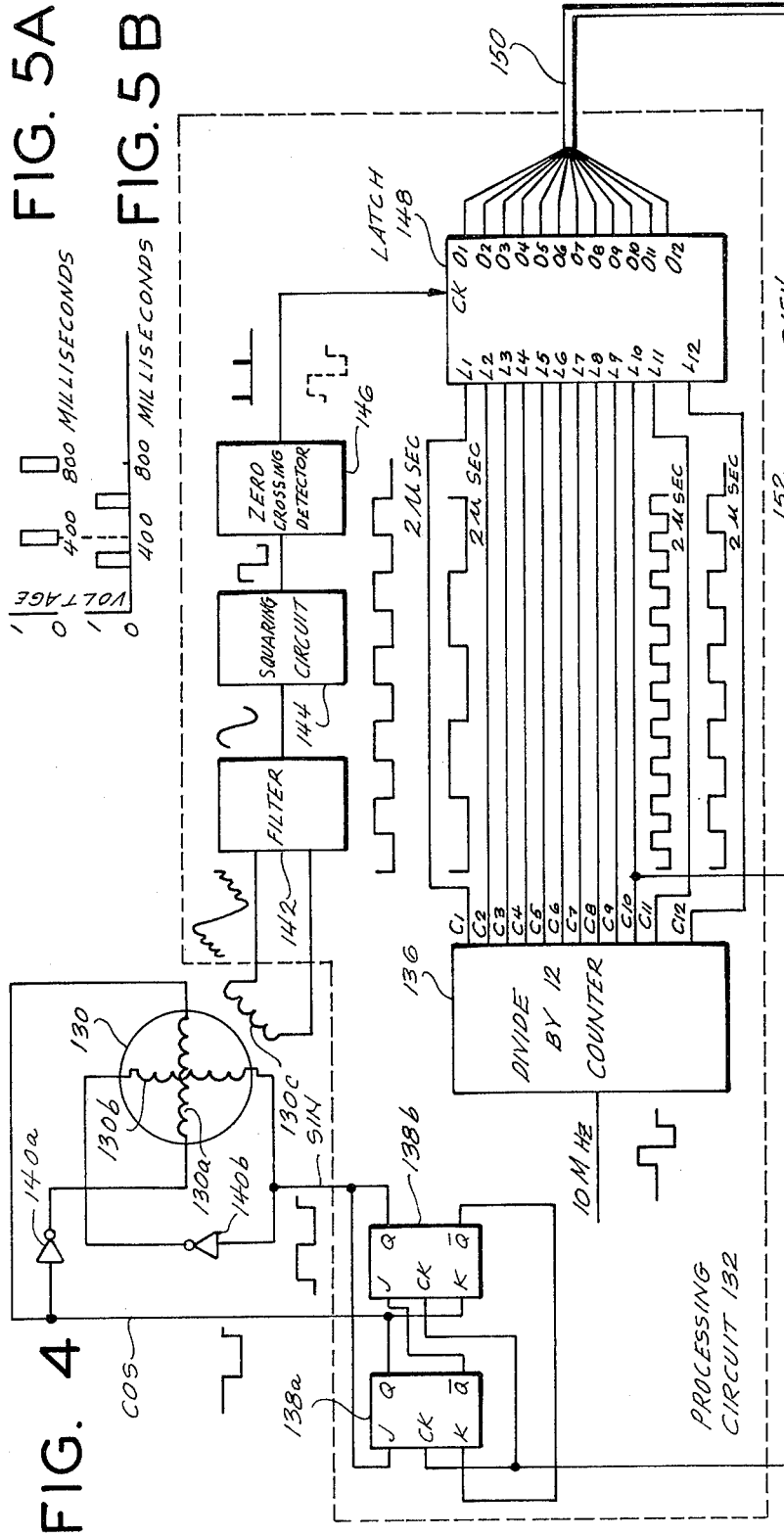

In operation, when resolver stator windings 130a and 130b are excited by flip-flops 138a and 138b, respectively, with approximately 2500 Hz COS and SIN signals, respectively, zero crossing detector 146 outputs a pulse (depicted graphically in FIG. 5A) approximately every 400 milliseconds during intervals when the resolver rotor winding 130c remains stationary. During intervals when resolver rotor winding 130c is rotatably driven by drive pinion 20 (FIG. 1A) relative to resolver stator windings 130a and 130b then, the output pulses produced by zero crossing detector 146 are phase shifted (as illustrated in FIG. 5B) relative to the output pulses produced by the zero crossing detector while the resolver rotor winding remains stationary (FIG. 5A). The zero crossing detector output pulses produced during intervals when the resolver rotor winding is rotating either lead or lag the zero crossing detector output pulses produced during intervals when the resolver rotor winding remains stationary depending on whether the reesolver rotor is rotating in a clockwise or counterclockwise direction, respectively. The rate at which the zero crossing detector pulses produced during intervals when resolver shaft is rotating, shift from those produced during intervals when the resolver shaft is stationary varies directly with resolver rotor speed.

Upon receipt of a zero crossing detector output pulse, latch 148 outputs a 12-bit binary signal. The logical state of each bit of the latch output signal (being either a binary "1" or a binary "0") varies in accordance with the amplitude (being either a binary "1" or a binary "0") of a separate one of counter 136 output signals $C_1$-$C_{12}$. Since resolver stator windings 130a and 130b are excited with the COS and SIN signals, respectively, which are each in synchronism with counter 136 output signals $C_1$-$C_{12}$, then the 12-bit binary latch output signal, hereinafter referred to as a count, is identical to the count previously generated by latch 148 approximately 400 milliseconds earlier during intervals when rotor winding 130c remains stationary. However, as resolver rotor winding 130c rotates relative to resolver stator windings 130a and 130b, the time interval between zero crossing detector output pulse varies, and is either greater or less than 400 milliseconds, depending on the difference in angular position between resolver rotor winding 130c and resolver stator windings 130a and 130b. Thus, during intervals when the spindle, and hence resolver winding 130c rotate, each time latch 148 is clocked by zero crossing detector 146, the binary value of the count outputted by the latch is greater or less than the previously outputted latch count because of the angular difference in position of the resolver rotor winding relative to the resolver stator windings. As will be explained in greater detail below, with respect to FIGS. 6 and 7, the latch output counts are processed by computer 162 of machine tool control system 154 in accordance with a pair of programs stored in memory 170 to determine not only motor shaft and hence spindle angular position, but motor speed as well.

Figure 4:
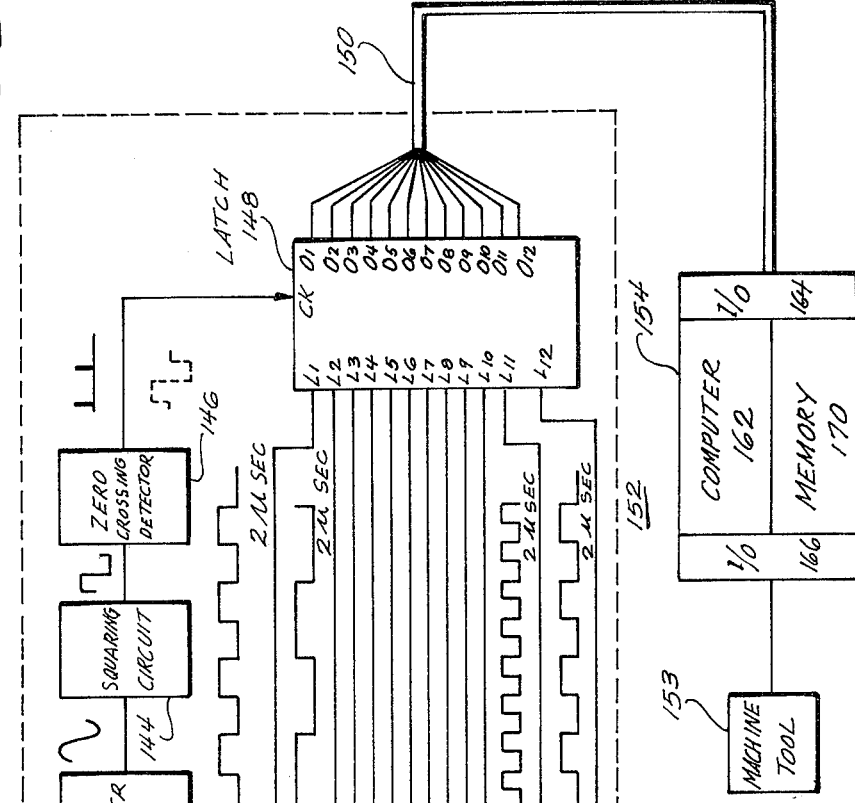
FIG. 4 is a schematic view of the processing circuit comprising a portion of the feedback transducer which is a part of the spindle drive system illustrated in FIGS. 1A and 1B.
Figure 6:
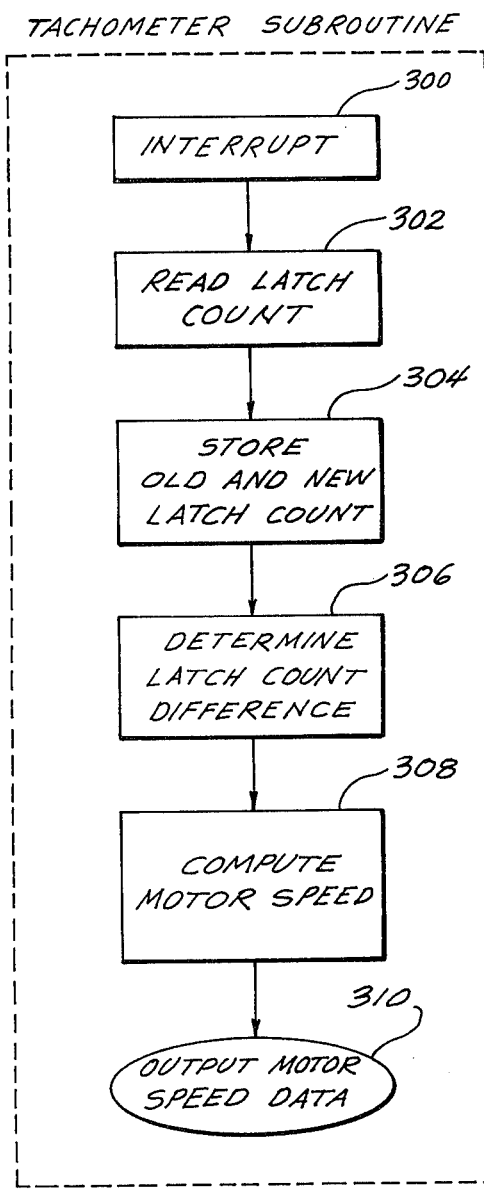
FIG. 6 is a flow chart representation of the TACHOMETER subroutine program which, when executed by the machine tool control system, processes the output signals from the processing circuit illustrated in FIG. 4 to compute spindle motor speed.

Referring now to FIG. 6 there is shown a flow chart representation of the program, designated as the TACHOMETER sub routine, which, when executed by computer 162 causes the computer to process the latch output counts to determine motor speed. TACHOMETER sub routine program execution is commenced upon receipt by the computer of an interrupt (step 300) which is typically generated by the drive amplifier (not shown) controlling motor 14 (FIG. 1A) of machine tool 153 (FIG. 4). Following receipt of the interrupt, computer 162 reads the latch output count of latch 148 (FIG. 4) twice (step 302), the second latch output count being read 4 milliseconds after receipt of the first latch output count by the computer. The first and second latch output counts, hereinafter designated as the "old" and "new" latch counts, are then stored in memory (step 304). Next, computer 162 determines the difference in the magnitude, designated as the COUNT DIFFERENCE, between the old and new latch output counts (step 306). Thereafter, motor speed is computed (step 308) in accordance with the formula:

motor speed = COUNT DIFFERENCE/4 milliseconds

Motor speed data is then outputted (step 310) to the drive amplifier controlling motor 14 which regulates motor 14 excitation accordingly.

Figure 7:
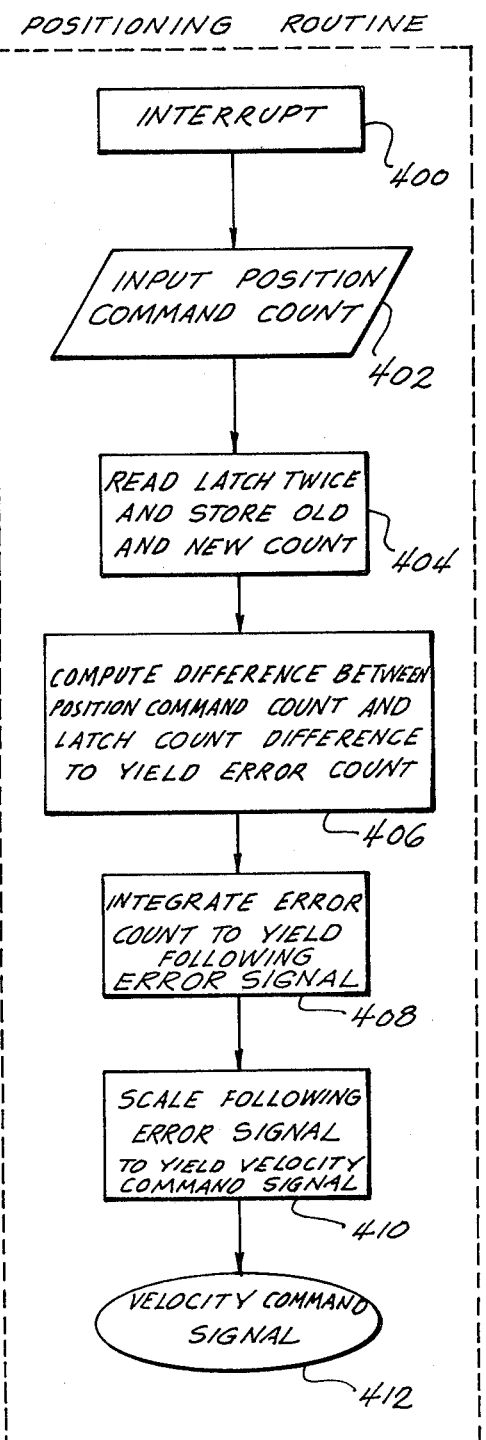
FIG. 7 is a flow chart representation of the POSITIONING subroutine program which, when executed by the machine tool control system, processes the output signals from the processing circuit illustrated in FIG. 4 to determine angular spindle position.

Referring now to FIG. 7, there is shown a flow chart representation of the POSITIONING sub routine program which is executed by computer 162 to control motor shaft position. To simplify the explanation of the POSITIONING sub routine program it will be assumed that motor shaft 14 (FIG. 1A) rotates in a 1:1 relationthe gear train may occur. To ascertain the angular orientation of spindle 40 and hence, driving shaft 33, a feedback transducer, taking the form of a resolver 130 and a processing circuit 132 (illustrated in FIG. 4), are provided to generate electrical signals indicative of spindle 40 and hence, driving shaft 33 angular position.

In the past it has been the practice to drive the resolver 130 directly from the spindle drive shaft 33 in order to retain the required synchronism between the spindle and the resolver so that the latter reflects the angular position of the spindle. However, the resolver 130 is regulating the operation of the motor 14 and with the resolver driven by the spindle drive shaft 33 there was always the problem of dealing with the backlash in the gear train between the motor 14 and the spindle 40. Such gear train comprises the gears 20 and 24a in engagement with the gears on the gear cluster 24 and the associated meshing gear on the drive shaft 33. This produced inaccuracies in the positioning of the spindle as well as potential hunting of the spindle when it arrives at the desired angular position.

The present invention eliminates this difficulty by the expedient of coupling the resolver 130 directly to the motor shaft 16 without the intervention of any gear train so that there is no backlash whatsoever between the resolver 130 and the motor 14. This arrangement greatly improves the accuracy of the control of the resolver 130 over the motor 14 but gives rise to the problem of retaining the synchronism between the resolver 130 and the spindle 40 in order that the resolver 130 will reflect the rotary position of the spindle. This problem is resolved in this invention by the unique arrangement of the gear train between the motor 14 and spindle 40.

To this end, as previously mentioned, the gears are fixed to the shaft 33 so that when the spindle 40 is in the keylock position the teeth of the gears 36a, 36b and 36c are in alignment. Moreover, the gears on the gear cluster 24 are of sufficient width relative to the width of the gears on the drive shaft 33 that when the gear cluster 24 is shifted it does not disengage from the gear with which it is in mesh until it is in partial engagement with the next gear with which it is moving into engagement.

Thus, FIG. 1A illustrates the gear 24a in meshing engagement with the gear 36a. If the gear cluster 24 is moved to the right as viewed in FIG. 1A the teeth of the gear 24a will remain in engagement with the teeth of the gear 36a while the teeth of the gear 24b are initially engaging the teeth of the gear 36b on the drive shaft 33. As a result, there is never any rotation of the three gear supporting shafts relative to each other but rather they always rotate in unison to retain the predetermined rotary relationship between the resolver 130 and the spindle 40. Of course, once the rotary relationship is maintained by the simultaneous engagement of the gears 24a and 36a as well as between the gears 24b and 36b, further shifting of the gear cluster 24 to the right will disengage the gear 24a from the gear 36a and the gear 24b will move into full engagement with the gear 36b. The same relationship exists between the gears 24c and 36c so that the rotary relationship of the resolver 130 with the spindle 40 is likewise maintained when the gear cluster 24 is shifted to the left as viewed in FIG. 1A to move the gear 24c into driving engagement with the gear 36c.

Resolver 130 is fastened in spindlehead 12 opposite to drive pinion 20 so that resolver shaft is coaxial with drive pinion 20 to enable coupling thereto by a universal coupling 136. Since spindle 40 (FIG. 1B) is in constant synchronism with driving shaft 33 through driven shaft 38, and since driving shaft 33 is in itself in constant synchronism with drive pinion 20 through cluster gear 24, the resolver shaft thus rotates directly with the spindle and, therefore, the resolver output signal varies directly with spindle position. By coupling the shaft of resolver 130 directly to the motor drive shaft 16 for rotation in unison therewith backlash in the feedback transducer loop is eliminated.

The schematic details of resolver 130 and processing circuit 132 are depicted in FIG. 4. Processing circuit 132 comprises a signal generator 136 which takes the form of a divide by N counter where N is typically 12. When supplied with a fixed frequency square wave reference signal, counter 136 generates N square wave output signals, $C_1 - C_N$, each successive counter output signal $C_{(n+1)}$ (where n runs from 1 to N−1) being one half the frequency of the proceeding counter output signal $C_n$. Typically, the frequency of the square wave periodic reference signal supplied to counter 136 is 10 Mhz so that the frequency of each of counter output signals $C_1 - C_N$ is as indicated below in Table I:

TABLE I

| Counter Output Signal | Frequency |
| --- | --- |
| $C_1$ | 5.0000 Mhz |
| $C_2$ | 2.5000 Mhz |
| $C_3$ | 1.2500 Mhz |
| $C_4$ | 625.00 Khz |
| $C_5$ | 312.500 Khz |
| $C_6$ | 156.250 Khz |
| $C_7$ | 78.1250 Khz |
| $C_8$ | 39.0625 Khz |
| $C_9$ | 19.5313 Khz |
| $C_{10}$ | 9.7656 Khz |
| $C_{11}$ | 4.8828 Khz |
| $C_{12}$ | 2.4414 Khz |

Output signal $C_{10}$ from counter 136, which is approximately 10 Khz in frequency, is supplied to the clock input of each of a pair of J-K flip-flops 138a and 138b. The J and K input of flip-flop 138b are coupled to the Q and $\overline{Q}$ outputs, respectively of flip-flop 138a, Conversely, the J and K inputs of flip-flop 138a are coupled to the $\overline{Q}$ and Q outputs, respectively, of flip-flop 138b. With flip-flops 138a and 138b interconnected in this manner, flip-flop 138a produces at its Q output an approximately 2500 Hz unipolar output (COS) signal in response to the approximate 10 Khz signal supplied to the flip-flop clock input. Flip-flop 138b, when clocked by counter 136 produces a unipolar output (SIN) signal of approximately 2500 Hz which is phase shifted 90° from the COS signal produced by flip-flop 138a.

Resolver 130 includes a pair of stator windings 130a and 130b, each physically displaced from one another by 90°, and a rotor winding 130c which is rotatably driven relative to stator windings 130a and 130b by drive pinion 20 (FIG. 1A). The Q output of flip-flop 138a is coupled to the first terminal of resolver winding 130a whose second terminal is coupled to the Q output of the flip-flop through an amplifier 140a. In a similar manner, the Q output of flip-flop 138b is coupled to the first terminal of resolver winding 130b, the second terminal of resolver winding 130b being coupled through an amplifier 140b to the Q output of flip-flop 138b. In this way, stator windings 130a and 130b are excited with the COS and SIN signals, respectively from flip-flops 138a and 138b, respectively, causing an alternating ship with spindle 40 (FIG. 1B). POSITIONING sub routine program execution is commenced upon receipt of an interrupt (step 400) following which, a position count, indicative of the desired motor shaft position and hence spindle shaft is inputted to the computer (step 402). Typically, the input position command is inputted into the computer from memory 170 where such data is stored after input in the machine tool control system from an input device (not shown) such as a tape reader.

Following input of the input position command (typically an 8-bit count) the output count of latch 148 (FIG. 4) is sampled twice by the computer at the beginning and the end of a 4 millisecond time interval to obtain a first and second ("old" and "new", respectively) latch count (step 404). Next, the difference in the magnitude between the input command position count and the latch count difference (being the difference in magnitude between the "old" and "new" latch counts) is computed to yield an error count (step 406). The error count is then integrated (step 408) to yield a following error signal which is then scaled (step 410) to provide a velocity command signal which varies in accordance with the difference between the actual and desired motor shaft and hence spindle angular position. The velocity command signal is then outputted (step 412) to the drive amplifier controlling motor 14 (FIG. 1A) to effectuate rotation of the spindle to the desired angular position. Note that if cluster gear shaft 26 (FIGS. 1A and 1B) were shifted from its central position to its leftward-most or rightward-most positions to effect a 3:1 or a 9:1 relationship between motor shaft and spindle shaft rotation, respectively, then it would be necessary to scale the "old" and "new" latch output counts by 3 or 9, respectively, prior to step 406, in order to obtain an accurate indication of spindle angular position.

Knowledge of when the cluster gear is at its leftward-most, central or rightward-most positions is obtained by a set of three proximity switches (not shown) which are each affixed so as to be actuated when the cluster gear is at its leftward-most, centered-most or rightward-most positions. Should cluster gear 24 and cluster gear shift 26 shift inadvertently during rotation, then one of the proximity switches will detect the shift to alert the machine tool control system of this condition so that an emergency stop can be effected to prevent possible damage to the spindle drive train.

As previously indicated, knowledge of when the spindle is at a keylock positon is very important, since it is necessary for the spindle to be at the keylock position to positively engage a shank of a cutting toolholder when inserted therein. Also, since teeth on each of gears 36a, 36b and 36c (FIG. 1A), which are keyed on driving shaft 33 (FIG. 1A), all line up when the driving shaft and hence the spindle shafts are angularly oriented at the keylock position, it is important to know whether or not the spindle is at a keylock position since it is desirable to shift cluster gear 24 (FIG. 1A) when the teeth on each of gears 36a, 36b and 36c line up. Detection of when the spindle is at a keylock position is accomplished by the computer during execution of the POSITIONING sub routine program by ascertaining the number of times the latch output count is zero, zero being the latch output count when, during intervals of resolver rotor winding rotation, the resolver rotor winding is at a particular angular orientation relative to the resolver stator windings. In practice, this particular resolver winding angular position corresponds exactly to the spindle keylock position when the spindle rotates in a 1:1 relationship with drive pinion 20 (FIG. 1A). Since the ratio of motor shaft rotation to spindle shaft rotation may change from 1:1 to 3:1 or 9:1, by shifting cluster gear shaft 26 rightwardly and leftwardly, respectively, from its central position, it is necessary, during intervals when the ratio of motor rotation to spindle shaft rotation is 3:1 and 9:1 to complete 1½ and 4½ revolutions, respectively, of the spindle following a zero latch count to assure a keylock position. Verification of when the spindle is at the keylock position is had when a proximity switch 415 (FIG. 1A) affixed to spindlehead 12 adjacent to gear 36c, is actuated by a dog on gear 36c in alignment with the spindle key (not shown).

It should be noted that due to the gear geometry, there will be several angular positions other than the spindle keylock position at which the gear teeth on each of gears 36a, 36b and 36c (FIG. 1A) line up, thus allowing shifting of cluster gear 24 and shaft 26 during intervals other than when the spindle is at the keylock position. These angular positions can be programmed into computer 162 (FIG. 4) so that during execution of the POSITIONING sub routine program, the computer will know if shifting can occur at a particular angular orientation of the spindle. During a machining operation it may be desirable to intentionally lock the spindle. This may readily be accomplished while motor 14 is de-energized by partially shifting cluster gear 24 and shaft 26 when the teeth on gears 36a, 36b and 36c line up so that the spindle will be prevented from moving.

Although the illustrative embodiment of the invention has been described in considerable detail for the purpose of fully disclosing a practical operative structure incorporating the invention, it is to be understood that the particular apparatus shown and described is intended to be illustrative only and that the various novel features of the invention may be incorporated in other structural forms without departing from the spirit and scope of the invention as defined in the subjoined claims.

The principles of this invention having now been fully explained in connection with the foregoing, we hereby claim as our invention:

1. In a spindle drive system for driving a machine tool spindle that is adapted to carry a rotary cutting tool; an electric motor having an output shaft; a transducer coupled directly to said output shaft for rotation in unison therewith; a gear train connected to transmit the drive from said output shaft to said spindle; a shiftable gear in said gear train for meshing engagement with any one of a plurality of gears selectively for varying the speed of said spindle; and retaining means in said gear train for retaining the individual gears of said gear train locked against rotation relative to each other during the movement of said shiftable gear so that the gears always remain in the same rotary position relative to each other to retain the constant synchronism between said transducer and the spindle.

2. A spindle drive system according to claim 1 in which the shiftable gear is adapted to mesh with any one of a plurality of gears that are fixed to rotate with a rotary shaft and the several gears on said rotary shaft are aligned so that when the spindle is in the desired angularly orientated position, the teeth of the gears therein that are in position to be engaged by the teeth of the shiftable gear are in alignment for receiving such teeth without the necessity of moving any of the gears.

3. A spindle drive system according to claim 1 wherein said retaining means comprises the width of said shiftable gear being sufficient to remain in engagement with a first gear while initially shifting into engagement with a second gear and then upon further shifting movement it fully disengages from the first gear so that the shifting movement is completed without interrupting the synchronism between said transducer and said spindle.

4. A spindle drive system according to claim 2 wherein said transducer is a resolver; and including means connecting said resolver for controlling said motor to regulate the angular orientation of said spindle when its rotation is discontinued.

* * * * *